(12) United States Patent
Fleckner et al.

(10) Patent No.: US 8,024,081 B2
(45) Date of Patent: Sep. 20, 2011

(54) METHOD AND DEVICE FOR CONTROLLING A HYBRID VEHICLE DRIVE

(75) Inventors: Marco Fleckner, Leonberg (DE); Nils Sauvlet, Bad Essen (DE); Markus Göhring, Nufringen (DE); Dieter Kraxner, Wurmberg (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 937 days.

(21) Appl. No.: 11/830,013

(22) Filed: Jul. 30, 2007

(65) Prior Publication Data

US 2008/0029320 A1 Feb. 7, 2008

(30) Foreign Application Priority Data

Jul. 28, 2006 (DE) .................. 10 2006 034 933

(51) Int. Cl.
*G05D 3/00* (2006.01)
(52) U.S. Cl. .................. 701/22; 180/65.1; 903/907
(58) Field of Classification Search .................. 701/22, 701/101; 180/65.1; 903/907
See application file for complete search history.

(56) References Cited

U.S. PATENT DOCUMENTS

| | | | | |
|---|---|---|---|---|
| 4,393,964 A | * | 7/1983 | Kemper | 477/6 |
| 5,778,326 A | * | 7/1998 | Moroto et al. | 701/22 |
| 5,832,396 A | * | 11/1998 | Moroto et al. | 701/22 |
| 6,166,449 A | * | 12/2000 | Takaoka et al. | 290/40 B |
| 6,507,127 B1 | * | 1/2003 | Amano et al. | 290/40 C |
| 6,847,189 B2 | * | 1/2005 | Frank | 320/104 |
| 6,907,948 B2 | * | 6/2005 | Wakashiro et al. | 180/65.25 |
| 6,982,540 B2 | * | 1/2006 | Richter et al. | 320/104 |
| 7,360,615 B2 | * | 4/2008 | Salman et al. | 180/65.265 |
| 7,404,460 B2 | * | 7/2008 | Oshidari | 180/65.235 |
| 7,463,958 B2 | * | 12/2008 | Suzuki | 701/22 |
| 7,659,698 B2 | * | 2/2010 | Elder et al. | 320/132 |
| 2004/0030471 A1 | * | 2/2004 | Faye | 701/22 |
| 2009/0029197 A1 | * | 1/2009 | Hibino et al. | 429/13 |

FOREIGN PATENT DOCUMENTS

| | | |
|---|---|---|
| DE | 198 31 487 C1 | 3/2000 |
| DE | 101 28 758 A1 | 12/2002 |
| EP | 1 256 476 A2 | 11/2002 |

* cited by examiner

*Primary Examiner* — Mark Hellner
*Assistant Examiner* — Helal A Algahaim

(57) ABSTRACT

A method and a device for controlling a hybrid vehicle drive. The device contains a multiplicity of control parameter sets with different set point charge states for a high performance battery of the electric motor. The set point charge states are assigned to a respective operating mode of the vehicle. A definition device for defining a current operating mode of the vehicle, as a result of which a control parameter set which corresponds to the defined current operating mode of the vehicle can be used to control a charge mode of the high performance battery of the electric motor with a corresponding set point charge state.

12 Claims, 7 Drawing Sheets

METHOD AND DEVICE FOR CONTROLLING A HYBRID VEHICLE DRIVE

CROSS-REFERENCE TO RELATED APPLICATION

This application claims the priority, under 35 U.S.C. §119, of German application DE 10 2006 034 933.4, filed Jul. 28, 2006; the prior application is herewith incorporated by reference in its entirety.

BACKGROUND OF THE INVENTION

Field of the Invention

The present invention relates to a method and a device for controlling a hybrid vehicle drive.

For some years what are referred to as hybrid drives have been commercially available as an alternative, which is economical in terms of fuel consumption and less damaging to the environment, to a conventional internal combustion engine.

For the hybrid drive, the general definition has become established that it contains at least two different energy transducers and two different energy stores.

With a few exceptions, in terms of practical implementation the transducers are an internal combustion engine and an electric motor and the energy stores are a combustible fuel and a battery.

A hybrid drive has the advantage over conventional vehicles with an internal combustion engine that to a large extent it can recover the braking energy (with the exception of the decrease in efficiency). The recovered braking energy is buffered in the battery of the electric motor, with the electric motor functioning as a mechanical/electrical transducer.

The buffering of the energy, that is to say the recovery, occurs during active braking and in the overrun mode. The overrun mode is a state of the vehicle in which the internal combustion engine is not actively driving the vehicle because the driver is not depressing the accelerator pedal. The vehicle is therefore in a passive state and is driven forward only by its own inertial mass until the various driving resistances gradually decelerate it to a stationary state.

In hybrid vehicle drives, the petroleum supply and ignition are switched off in the overrun phase and furthermore technical measures are taken to prevent the engine brake of the internal combustion engine in the overrun mode and thus allow the kinetic energy to be passed as completely as possible to the electric motor which is configured as a mechanical/electrical transducer. This can be done most simply by closing the valves completely and thus not allowing any more air to pass through the intake section and into the cylinders. There is then no pumping loss any more. Likewise, mechanical decoupling of the internal combustion engine by a corresponding clutch is also possible.

The dynamo effect of the electric motor which functions as a transducer generates a braking effect which, however, is significantly weaker than the conventional engine brake of the internal combustion engine.

An important characteristic variable in a hybrid drive is the set point charge state, also referred to as set point state of charge (SOC), of the high performance battery of the electric drive of a hybrid vehicle drive. The set point SOC usually lies in a narrow window, for example 60%±5%.

As soon as the SOC lies below this window, the control of the vehicle brings about a charging process of the high performance battery of the electric drive of a hybrid vehicle drive until the SOC lies in the aforesaid window again.

The charging process occurs either in a recovery mode or in the load point raising mode, in which latter case the internal combustion engine supplies part of its torque to the drive and supplies the other part as a generator torque for the electric motor, in order to generate electric energy for the high performance battery in this way and store it in the battery.

The fact that the load point raising mode has a disruptive and uneconomical effect in certain operating situations, for example steep uphill journeys, has proven disadvantageous in the known hybrid vehicle drives.

SUMMARY OF THE INVENTION

It is accordingly an object of the invention to provide a method and a device for controlling a hybrid vehicle drive which overcomes the above-mentioned disadvantages of the prior art devices and methods of this general type, which provides an improved method and an improved controllable device for controlling a hybrid vehicle drive.

With the foregoing and other objects in view there is provided, in accordance with the invention a method for controlling a hybrid vehicle drive having an internal combustion engine and an electric motor. The method includes the steps of providing a multiplicity of control parameter sets with different set point charge states for a high performance battery of the electric motor; assigning a respective operating mode of a vehicle to the multiplicity of control parameter sets; defining a current operating mode of the vehicle; and using a respective control parameter set of the control parameter sets, corresponding to the current operating mode of the vehicle, to control a charge mode of the high performance battery of the electric motor with a corresponding set point charge state.

The method according to the invention for controlling a hybrid vehicle drive or the corresponding device has the advantage that the load raising mode can be configured more flexibly and as a result consumption advantages and/or an increase in driving comfort can be achieved.

The idea on which the present invention is based uses dynamic adaptation of the SOC to reduce the proportion of the load raising mode for charging the battery, so that fuel can be saved, and more power is available in certain driving situations. Furthermore, the battery load can be reduced and the service life of the battery can thus be extended.

According to one preferred development, the operating mode corresponds to a respective road type which is detected by a navigation device.

According to a further preferred development, the operating mode corresponds to a respective traffic situation which is detected by a traffic situation detection device.

According to a further preferred development, the operating mode corresponds to a respective road gradient which is detected by a gradient detection device.

According to a further preferred development, the operating mode corresponds to a respective terrain type which is detected by a terrain type detection device.

According to a further preferred development, the operating mode corresponds to a respective vehicle velocity which is detected by a velocity detection device.

According to a further preferred development, a multiplicity of possible set point charge states are defined on the basis of the current operating mode of the vehicle and one of the defined set point charge states is prioritized in accordance with a predefined prioritization scheme.

Other features which are considered as characteristic for the invention are set forth in the appended claims.

Although the invention is illustrated and described herein as embodied in a method and a device for controlling a hybrid vehicle drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
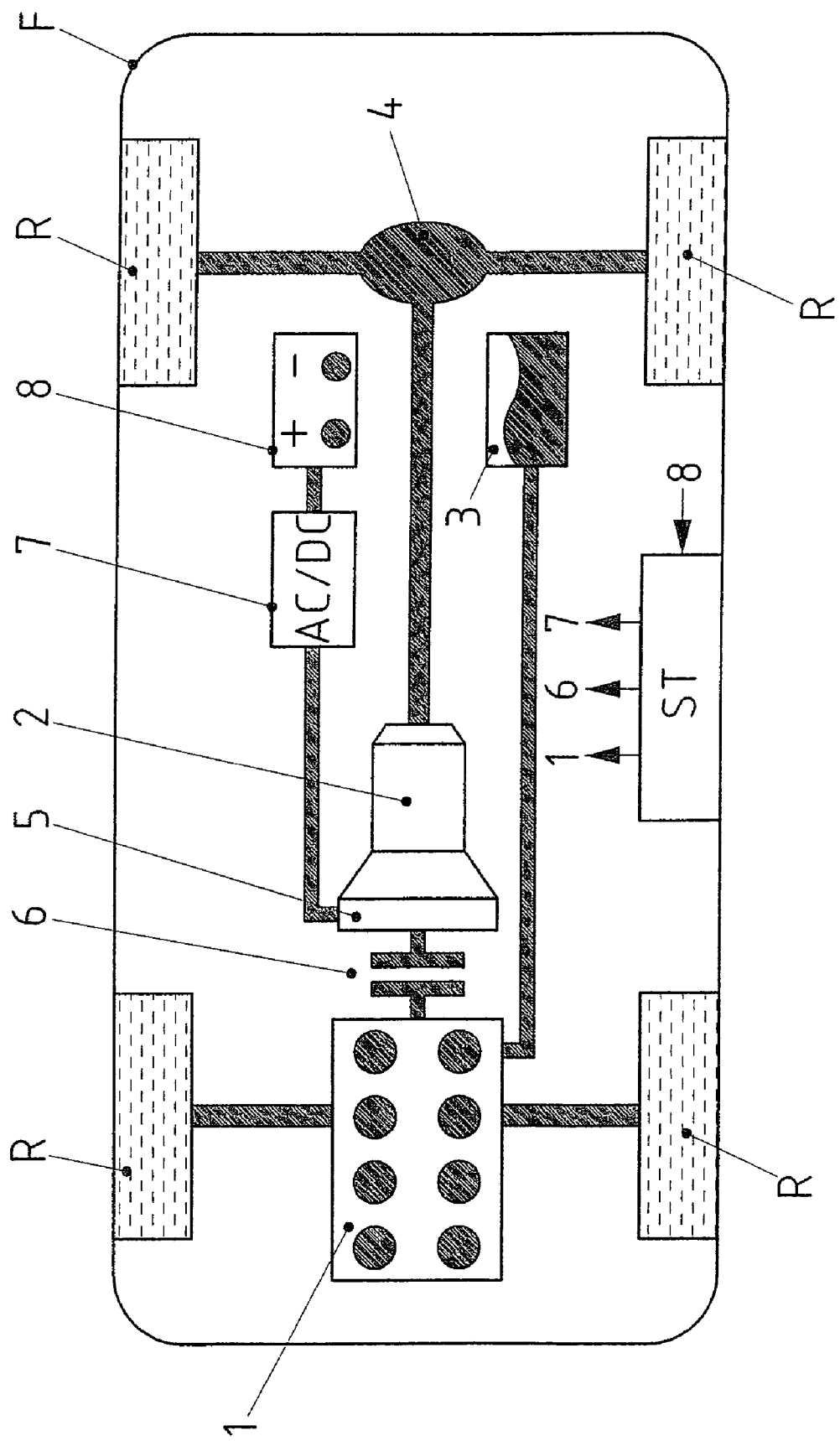
FIG. 1 is a block diagram of a hybrid vehicle drive to which the present invention can be applied.

In the figures, the same reference symbols designate identical or functionally identical elements. Referring now to the figures of the drawing in detail and first, particularly, to FIG. 1 thereof, there is shown a block diagram of a hybrid vehicle drive to which the present invention can be applied. In FIG. 1, reference symbol F designates a parallel hybrid vehicle drive whose drive train which acts on wheels R is composed of an internal combustion engine 1, a clutch 6, an electric motor 5, a transmission 2 and a differential 4. A fuel tank 3 stores fuel as an energy carrier for the internal combustion engine 1. A high performance battery 8 stores electrical energy for the electric motor 5. A conversion control device 7 is connected between the high performance battery 8 and the electric motor 5 and can operate bidirectionally, namely can feed electrical energy from the high performance battery 8 to the electric motor 5 in an electric drive mode, and can convert oscillating current energy supplied by the electric motor 5 into a direct current in a recovery mode, and can thus charge the high performance battery 8.

The hybrid vehicle drive F according to FIG. 1 has the following drive modes First, a conventional internal combustion engine mode without activation of the electric drive. Second an electric drive mode without activation of the conventional internal combustion engine drive. Third, boosting in which the internal combustion engine drive is supported by the electric drive. Fourth, a recovery mode in which the kinetic energy of the vehicle is recovered as electrical energy for the high performance battery 8 and the clutch 6 is opened. Fifth, a load point raising mode in which the internal combustion engine 1 supplies part of its torque to the drive and supplies the remaining part as the generator torque for the electric motor 5 in order to generate electrical energy for the high performance battery 8 by the electric motor 5 and to store it in the high performance battery 8.

A control device which is designated by reference symbol ST in FIG. 1 controls the load point of the internal combustion engine 1, the position of the clutch 6 and the conversion control device 7 as a function of the driving mode situation. Furthermore, the control device ST is connected to the high performance battery 8 in such a way that it can continuously monitor its charge state SOC.

In order to reach an optimum setting of the hybrid vehicle drive F for the respective operating situation, operating situation parameters such as, for example, rotational speed, velocity, degree of activation of the accelerator pedal, engine load, charge state . . . are fed to the control device ST via non-illustrated detection devices, and on the basis of the parameters the control device ST calculates the respective optimum operating setting by use of predefined control algorithms and actuates the internal combustion engine 1, the clutch 6 and the conversion control device 7 using corresponding control parameter sets.

Figure 2:
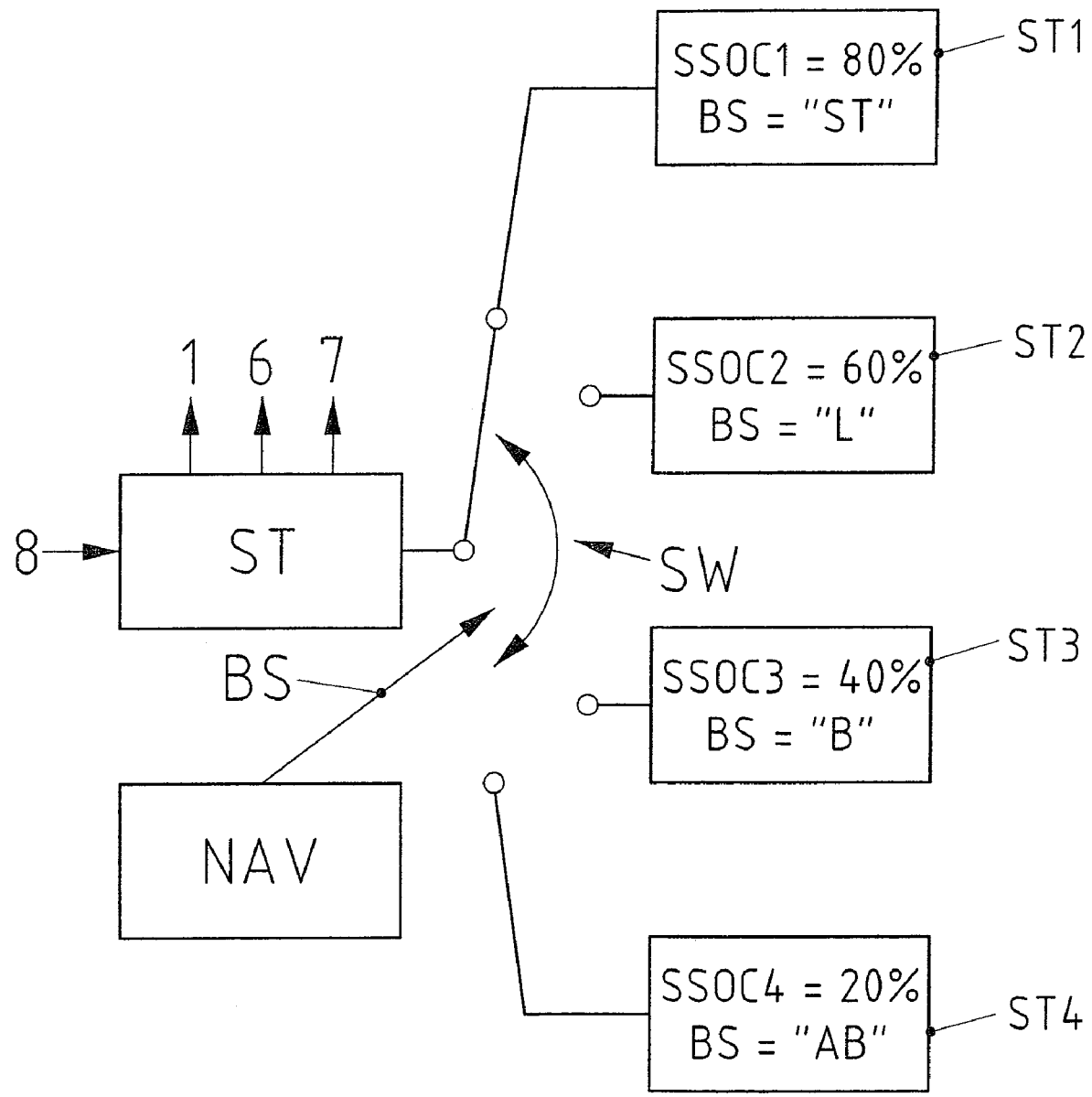
FIG. 2 is a block diagram of a first embodiment of a device according to the invention for controlling the hybrid vehicle drive.

FIG. 2 shows a block diagram of a first embodiment of a device according to the invention for controlling a hybrid vehicle drive.

With reference to FIG. 2, ST1, ST2, ST3, ST4 designate a memory device with control parameter sets which are stored or can be calculated by the processor of the control device ST and differ in particular in the set point charge state of the high performance battery 8.

In the first control parameter set ST1, the set point charge state SSOC1=80%. In the second control parameter set ST2 the set point charge state SSOC2=60%. In the third control parameter set ST3 the set point charge state SSOC3=40%. In the fourth control parameter set ST4 the set point charge state SSOC4=20%. The position of an intermediately connected switching device SW determines which control parameter set ST1, ST2, ST3, ST4 is used by the control device ST to set the set point charge state of the high performance battery 8, it being possible to control the switching device SW in this embodiment automatically by a switching signal BS from a navigation device NAV. The switching device SW has the switch positions "ST" for urban mode, "L" for country road mode, "B" for highway mode and "AB" for freeway mode. If the navigation device NAV determines that the vehicle is in the urban mode it outputs a switching signal BS="ST", after which the control parameter set ST1 in which the set point charge state SSOC1=80% is activated.

The same applies for a country road mode BS="L" and SSOC2=60%, highway mode BS="B", SSOC3=40% and freeway mode BS="AB" and SSOC4=20%.

The logic behind the control strategy is that the set point charge state is reduced more the higher the anticipated or average velocity of the vehicle, determined in relation to the type of road. The traveling vehicle stores kinetic energy which can be recovered for the high performance battery 8 by the aforesaid recovery mode when decelerations occur. Since it is known that the vehicle which is traveling at a certain velocity is decelerated again at the latest at the end of the journey, the set point charge state is defined as a function of the velocity of the vehicle which is determined in relation to the type of road. In particular, it becomes apparent in this way that the faster the vehicle travels the smaller the set point charge state has to be. This control strategy avoids in particular a situation in which a load raising mode is carried out at relatively high velocities, which has the effect of lowering consumption. Instead, the kinetic energy is only recovered when deceleration occurs.

Figure 3:
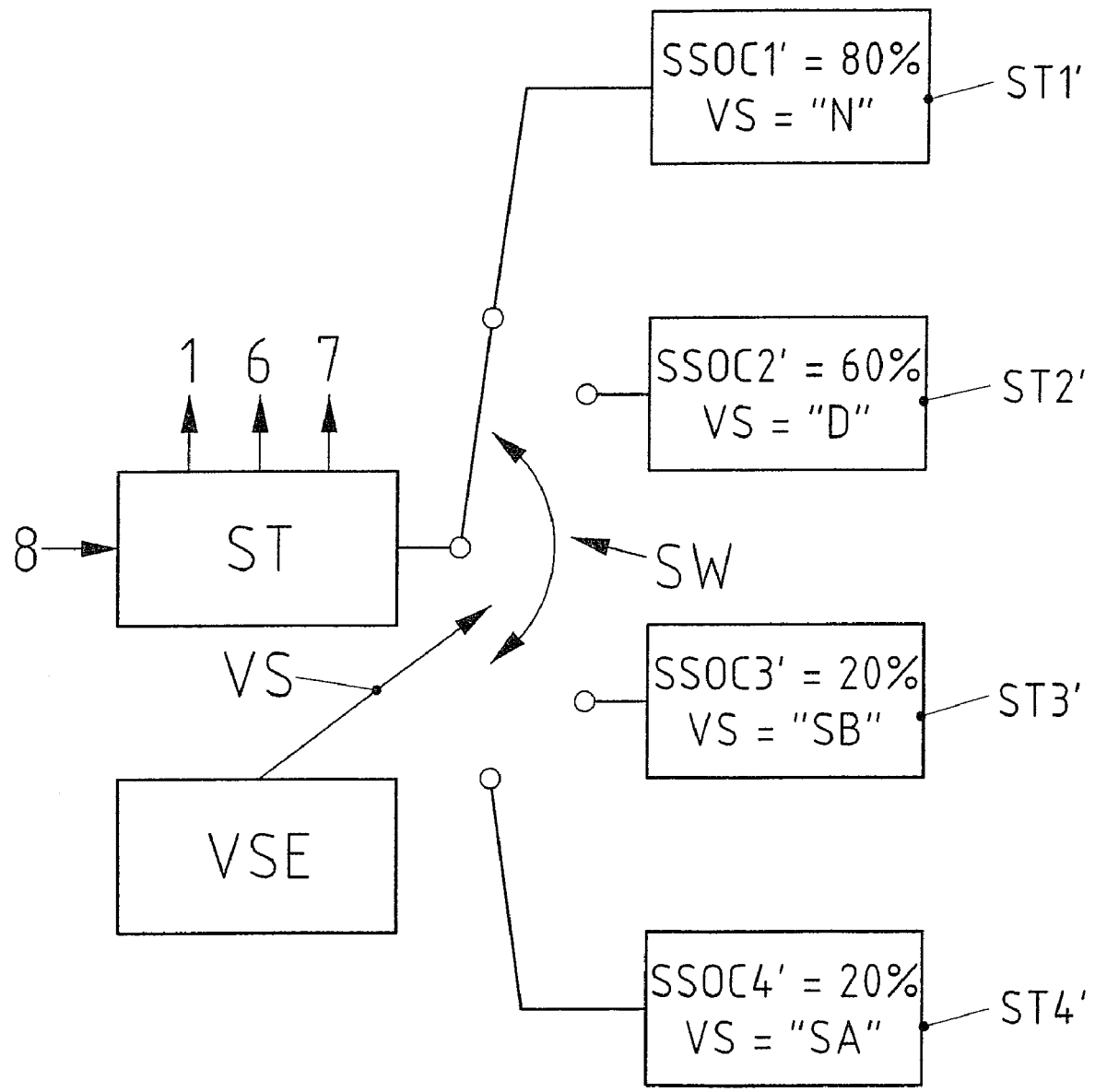
FIG. 3 is a block diagram of a second embodiment of the device according to the invention for controlling the hybrid vehicle drive.

FIG. 3 shows a block diagram of a second embodiment of a device according to the invention for controlling a hybrid vehicle drive.

In the second embodiment illustrated in FIG. 3, the control parameter sets are designated by ST1', ST2', ST3', ST4'. The switching device SW is controlled in this embodiment by a traffic situation detection device VSE with a corresponding switching signal VS. The traffic situation detection device VSE detects the traffic states "N" for normal traffic, "D" for dense traffic, "SB" for backed-up traffic and "SA" for anticipated backed-up traffic (within a predefined time period of 30 minutes).

As a result, a set point charge state SSOC1'=80% is selected by suitably actuating the switching device SW by the switching signal VS when VS="N". When VS="D" a set point charge state of SSOC2'=60% is selected. When VS="SB" a set point charge state SSOC3'=20% is selected, and when VS="SA" a set point charge state SSOC4'=20% is selected.

In this second embodiment, not only is a current traffic state taken into account by the switch positions "N", "D", "SB" but also an anticipated traffic state is also taken into account with the switch position "SA". Through such predictive adaptation of the set point charge state it is also possible to reduce the proportion of the load raising mode for charging the battery, and thus save fuel.

Figure 4:
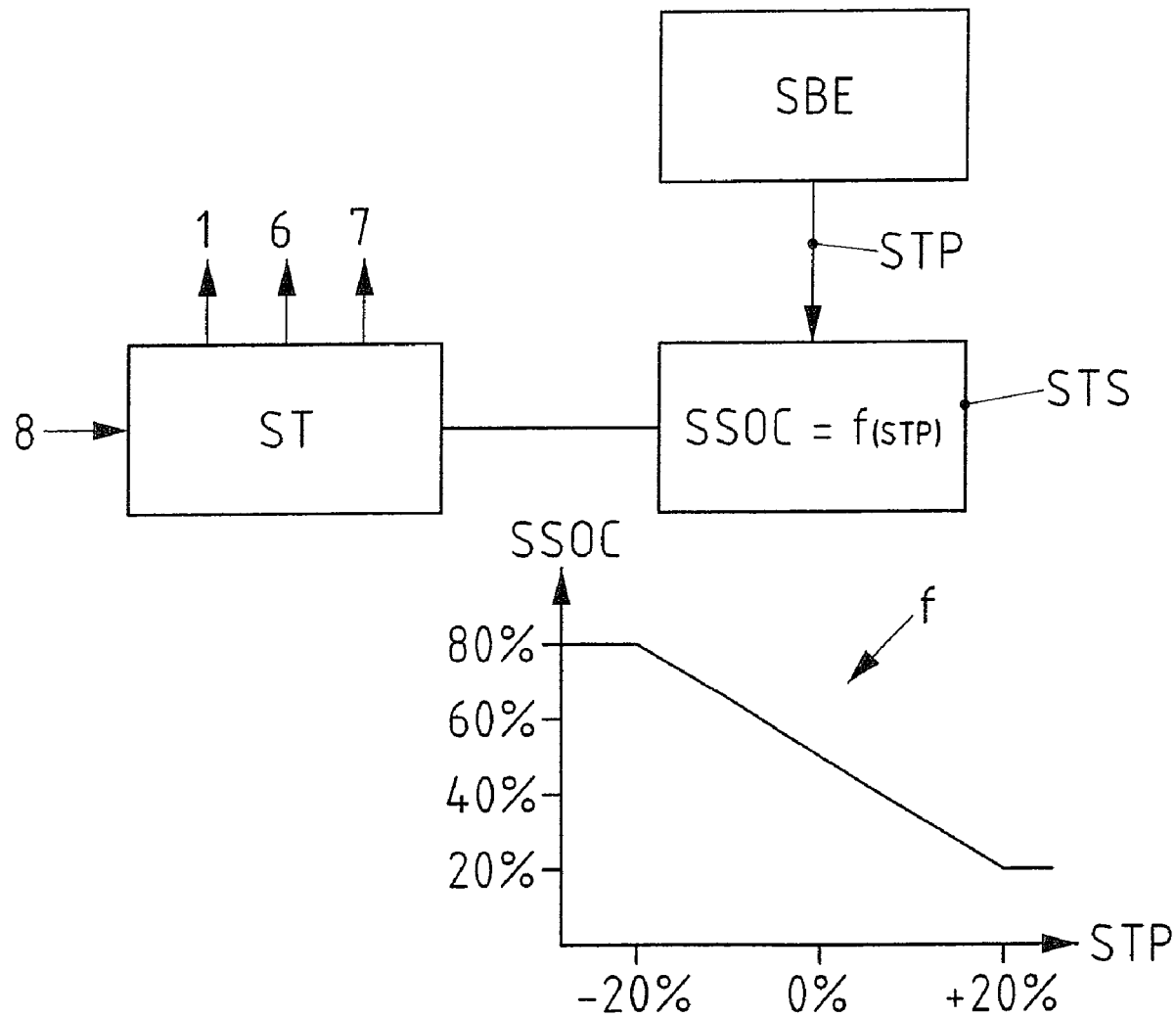
FIG. 4 is a block diagram of a third embodiment of the device according to the invention for controlling the hybrid vehicle drive.

FIG. 4 shows a block diagram of a third embodiment of a device according to the invention for controlling a hybrid vehicle drive.

In the third embodiment according to FIG. 4, reference symbol SBE designates a gradient detection device which supplies a control signal STP corresponding to a detected gradient of the road being currently driven on by the vehicle to a set point charge state definition device STS. The control parameter definition device STS calculates the set point charge state SSOC as a function f of the detected gradient when the control signal STP is being used.

The function f is likewise illustrated in FIG. 4 and varies in the range of gradients between −20% and +20% in a linear fashion between a set point charge state SSOC=80% given a gradient STP=−20% and a set point charge state SSOC=20% given a gradient STP=+20%. Outside this gradient range the function remains constant at STOC=80% or SSOC=20%.

In this embodiment, there is therefore continuous adaptation of the set point charge state SSOC using a numerical calculation or calculation by means of tables.

Figure 5:
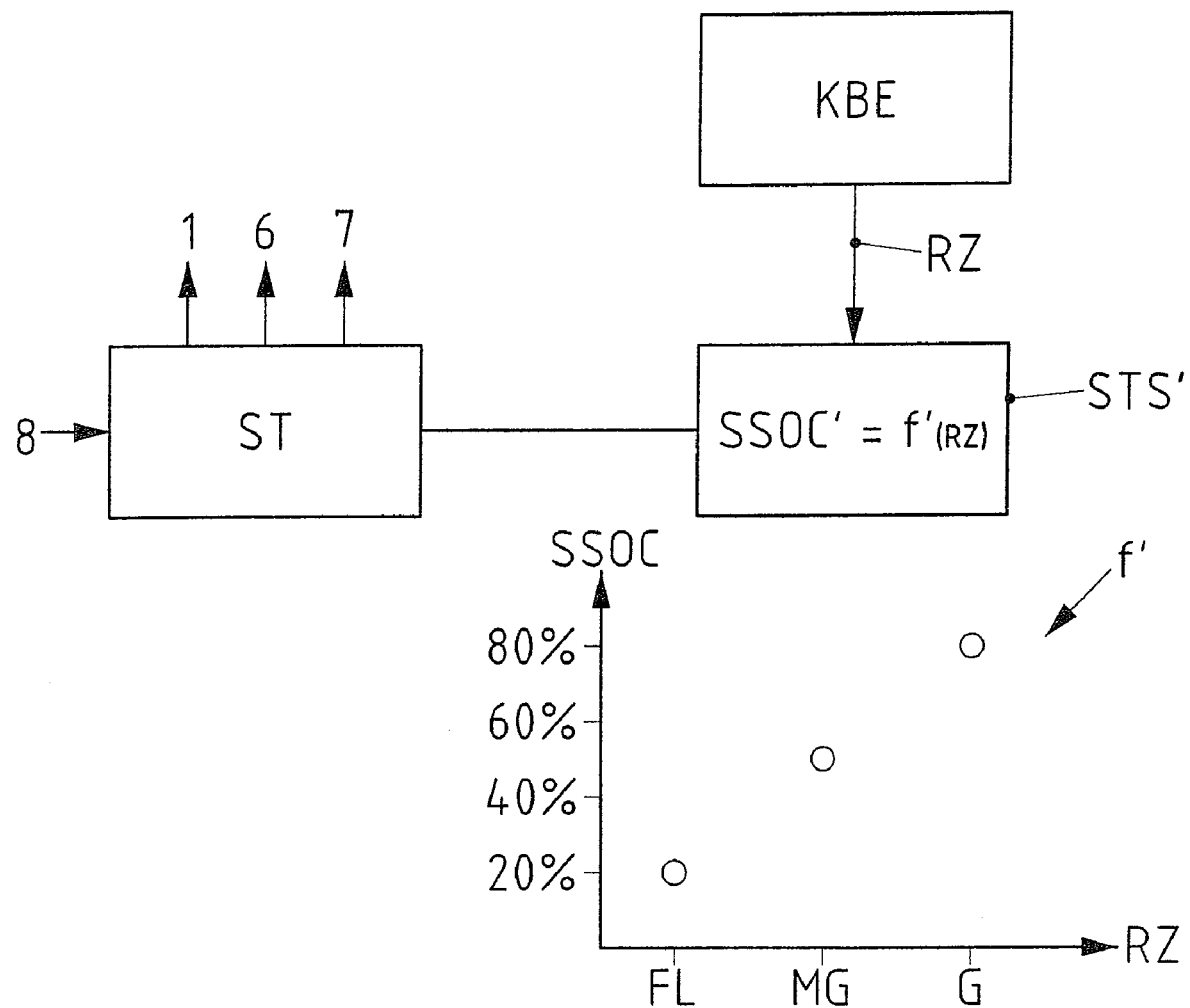
FIG. 5 is a block diagram of a fourth embodiment of the device according to the invention for controlling the hybrid vehicle drive.

FIG. 5 shows a block diagram of a fourth embodiment of a device according to the invention for controlling a hybrid vehicle drive.

In the fourth embodiment according to FIG. 5, reference symbol KBE designates a category detection device for detecting one of three possible categories of a road which is currently being traveled on by the vehicle. The first category "FL" designates flat country, the second category "MG" designates rolling country and the third category "G" designates mountainous country.

Depending on a control signal RZ of the category detection device KBE, the set point charge state SSOC' of the high performance battery 8 of the vehicle hybrid drive is set in accordance with the function f by the control parameter definition device STS', which is also illustrated in FIG. 5.

In the category "FL", the set point charge state SSOC=20%. In the category "MG" the set point charge state SSOC=50%. In the category "G" the set point charge state SSOC=80%.

In this fourth embodiment, the function f is therefore a function with discrete values.

Figure 6:
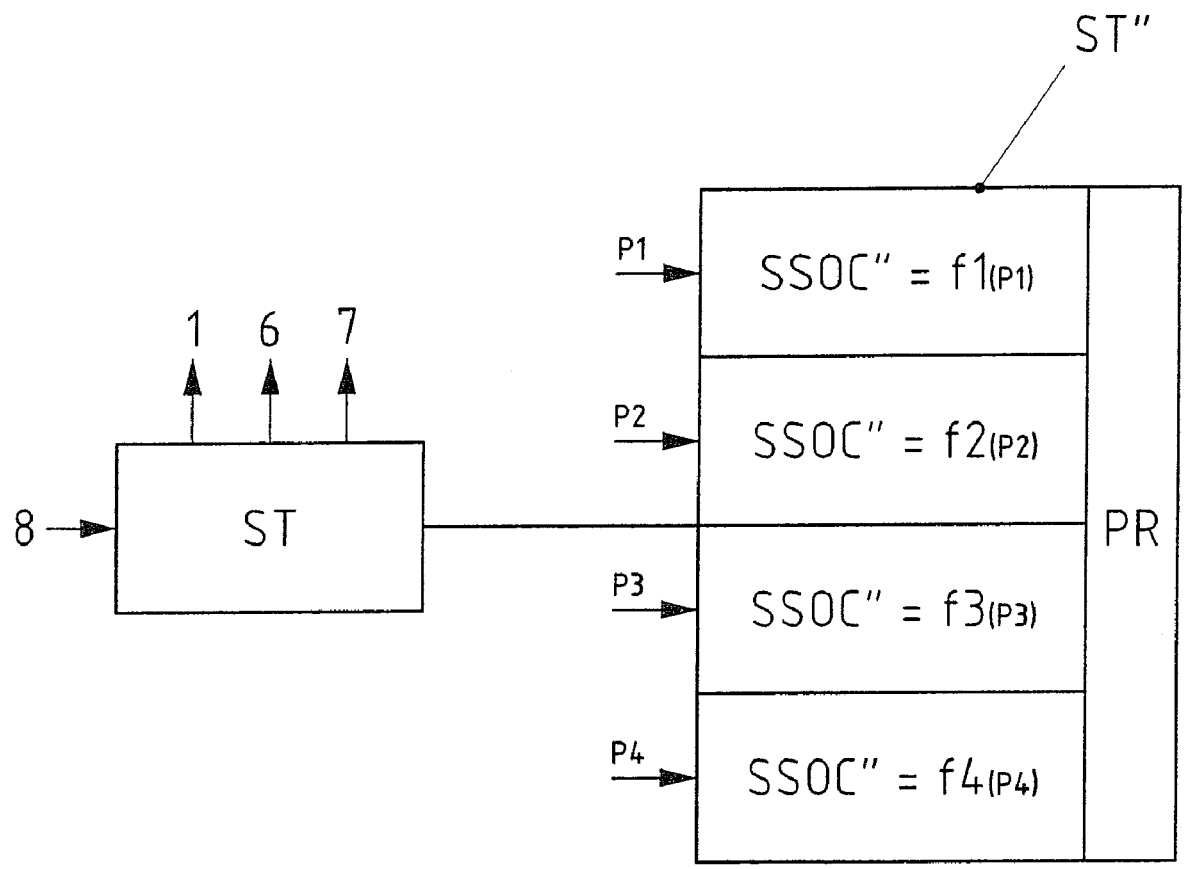
FIG. 6 is a block diagram of a fifth embodiment of the device according to the invention for controlling the hybrid vehicle drive.

FIG. 6 shows a block diagram of a fifth embodiment of a device according to the invention for controlling a hybrid vehicle drive. In the fifth embodiment according to FIG. 6, reference symbol ST" designates a control parameter definition device. The control parameter definition device ST" is supplied with the parameters P1, P2, P3, P4. A respective corresponding battery set point charge state SSOC" is calculated simultaneously on the basis of the parameters P1, P2, P3, P4 by the functions f1, f2, f3, f4. During such calculation by use of the various functions, a conflict may occur, that is to say a different set point charge state SSOC may be required depending on the respective parameter and the respective function.

In order to resolve such a conflict, a prioritization device PR is provided which, when a conflict occurs, decides which set point charge state SSOC" which is calculated on the basis of the functions f1, f2, f3, f4 is actually set. For example, an existing traffic jam could have a higher priority than the driving situation "urban mode" etc.

Figure 7:
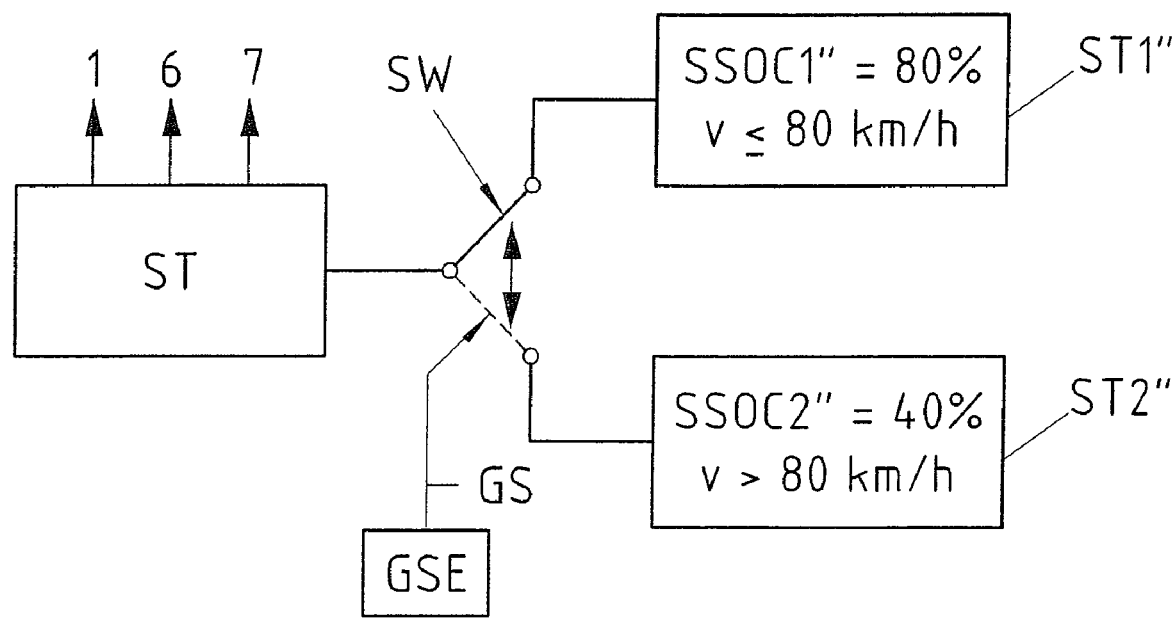
FIG. 7 is a block diagram of a sixth embodiment of the device according to the invention for controlling the hybrid vehicle drive.

FIG. 7 shows a block diagram of a sixth embodiment of a device according to the invention for controlling a hybrid vehicle drive.

In the sixth embodiment according to FIG. 7, a velocity detection device GSE is provided whose switching signal GS actuates the switching device SW to set the desired set point charge state. If the velocity v≦80 km/h, the control parameter set ST1" which is connected to a set point charge state SSOC"=80% is set. If the velocity is more than 80 km/h, the control parameter set ST2", which is connected to a set point charge state of SSOC2"=40%, is set.

Even though the present invention has been described above with reference to preferred exemplary embodiments, it is not restricted thereto but rather can be modified in a variety of ways.

Even though certain driving situations or operating parameters have been used to determine the set point charge state to be selected in the embodiments described above, the present invention is not restricted thereto. For example, any further desired or different driving situations or operating parameters can be used to determine the set point charge state to be selected. In particular, the number of categories or selection possibilities for the set point charge state is not restricted to the specified exemplary values either.

Even though a manual or controllable switching device has been used to select the control parameters set in the embodiments described above, other forms of implementation, for example different addressing of the memory device in order to store the control parameter sets, can also be imagined.

The specified SOC values are also only exemplary and can vary greatly depending on the vehicle.

The invention claimed is:

1. A method for controlling a hybrid vehicle drive having an internal combustion engine and an electric motor, which comprises the steps of:
providing a multiplicity of control parameter sets with different set point charge states for a high performance battery of the electric motor;
assigning a respective operating mode of a vehicle to the multiplicity of control parameter sets;

defining a current operating mode of the vehicle from a current operating parameter of the vehicle or a current driving situation of the vehicle;

defining a multiplicity of possible set point charge states on a basis of the current operating mode of the vehicle;

prioritizing one of the set point charge states in accordance with a predefined prioritization scheme resulting in a prioritized set point charge state; and using a respective control parameter set of the control parameter sets, corresponding to the current operating mode of the vehicle and to the prioritized set point charge state, to control a charge mode of the high performance battery of the electric motor with the prioritized set point charge state.

2. The method according to claim 1, which further comprises correlating the current operating mode to correspond to a respective road type detected by a navigation device.

3. The method according to claim 1, which further comprises correlating the current operating mode to correspond to a respective traffic situation detected by a traffic situation detection device.

4. The method according to claim 1, which further comprises correlating the current operating mode to correspond to a respective road gradient detected by a gradient detection device.

5. The method according to claim 1, which further comprises correlating the current operating mode to correspond to a respective terrain type detected by a terrain type detection device.

6. The method according to claim 1, which further comprises correlating the current operating mode to correspond to a respective vehicle velocity detected by a velocity detection device.

7. A device for controlling a hybrid vehicle drive having an internal combustion engine and an electric motor, the device comprising:

a memory device storing a multiplicity of control parameter sets with different set point charge states for a high performance battery of the electric motor, said set point charge states being assigned to a respective operating mode of a vehicle;

a definition device for defining a current operating mode of the vehicle from a current operating parameter of the vehicle or a current driving situation of the vehicle, said definition device defining a multiplicity of possible set point charge states on a basis of the current operating mode of the vehicle; and a prioritization device for prioritizing one of the defined set point charge states in accordance with a predefined prioritization scheme resulting in a prioritized set point charge state, a respective control parameter set of said control parameter sets corresponding to the current operating mode of the vehicle being used to control a charge mode of the high performance battery of the electric motor with the prioritized set point charge state.

8. The device according to claim 7, wherein said definition device has a navigation device, and the current operating mode corresponds to a respective road type detected by said navigation device.

9. The device according to claim 7, wherein said definition device has a traffic situation detection device, and the current operating mode corresponds to a respective traffic situation detected by said traffic situation detection device.

10. The device according to claim 7, wherein said definition device has a gradient detection device, and the current operating mode corresponds to a respective gradient detected by said gradient detection device.

11. The device according to claim 7, wherein said definition device has a terrain type detection device, and the current operating mode corresponds to a respective terrain type detected by said terrain type detection device.

12. The device according to claim 7, wherein said definition device has a velocity detection device, and the operating mode corresponds to a respective velocity which can be detected by the velocity detection device.

* * * * *